United States Patent [19]

Doyle et al.

[11] Patent Number: 4,936,165
[45] Date of Patent: Jun. 26, 1990

[54] VARIABLE SPEED TRANSMISSION UNIT

[75] Inventors: James V. Doyle, Co. Wexford; Kieran A. Comerford, Dublin, both of Ireland

[73] Assignee: Doyle Transmission Limited, Coolballow, Ireland

[21] Appl. No.: 234,119

[22] Filed: Aug. 19, 1988

[30] Foreign Application Priority Data

Aug. 19, 1987 [IE] Ireland .................................. 1628/87
Aug. 17, 1988 [IE] Ireland .................................. 2507/88

[51] Int. Cl.$^5$ ............................................. F16H 37/00
[52] U.S. Cl. ......................................... 475/72; 475/151; 475/211; 475/330
[58] Field of Search ........................... 74/681, 682, 689

[56] References Cited

U.S. PATENT DOCUMENTS

| 2,117,340 | 5/1938 | Maurer | 74/689 |
| 2,384,776 | 9/1945 | Trofimor | 74/689 |
| 2,647,417 | 8/1953 | Trofimor | 74/689 |
| 2,972,905 | 2/1961 | Bullard III | 74/681 |
| 3,046,814 | 7/1962 | Soehrman | 74/689 |
| 4,690,016 | 9/1987 | Whalen | 74/682 X |

Primary Examiner—Dirk Wright
Attorney, Agent, or Firm—Fleit, Jacobson, Cohn, Price, Holman & Stern

[57] ABSTRACT

A variable speed transmission assembly comprises a variator (3) connected between main power input and output shafts (1 and 4), a power split differential gear assembly (2) splits power from the input between the output and the variator and the variator output is connected to a ratio spread differential (5), one output of which is connected to the main power output shaft, the other output also feeding the variator input, so that the variator handles less than one half of the total power and, the variator input runs at a speed which is inversely proportional to the output speed. In this way, the variator is better able to handle its power throughput.

8 Claims, 5 Drawing Sheets

VARIABLE SPEED TRANSMISSION UNIT

BACKGROUND OF THE INVENTION

The present invention relates to variable speed transmission units.

In automobile engineering and for other uses manual gear boxes are being superseded by automatic gear boxes. Essentially, automatic gear boxes in common use are of two types namely, a hydraulic type having a fluid flywheel incorporating a torque convertor and a number of fixed gears to give a finite number of gear ratios between the power input and power output, and what are true continuously variable transmission units incorporating a variator or composed entirely of a variator which allows an infinite number (in practical terms), of gear ratios, within the overall ratio spread of the variator between the input shaft and the output shaft. One example of such a variator transmits torque between two driving discs or pulleys having a driving surface of generally V-shaped cross-section. The belt acts as a torque transmitting element and the pulley diameters are varied to accommodate the speed variations. The variator can also be a hydraulic motor pump system or an electrical motor generator set or the thyroidal traction type, or simply the traction type in which power is transmitted by transferring axial pressure on driving discs. These variators are being used more extensively in motor cars. However, they suffer from certain disadvantages as indeed, do all automatic transmission units. These units are, generally speaking, inefficient in that there is considerable power loss in use and they are of necessity more complex than a manual gear box. Further, these units are relatively heavy, further reducing the power efficiency of the unit, particularly an automobile. The power loss in these variators is of the order of 10% to 20% of the power input.

Power split CVTs (Continuously Variable Transmissions) have been provided in the past. In general, they consist of an input shaft driving a differential gear which divides the drive into two outputs. One output goes direct to the output, while the other goes through a variator, either to the input or output. In this way, the power is split depending on the gear ratio of the differential so that the variator is only called upon to handle a proportion of the total power.

Attempts to develop commercial versions of the above devices have not so far been successful. Power split CVT's which feed the output of the variator to the main output shaft require a very wide ratio spread because of the considerable difference in speeds between the output gear of the differential to the variator and the main output shaft. Such devices have been successfully developed using hydraulic motor-pump type variators but these are too inefficient to be used in modern road vehicles.

Devices where the power is fed back to the input suffer from problems caused by re-circulating torques, and do not provide engine braking. This is discussed in more detail below.

Specifically, variable speed transmission assemblies have been proposed comprising a main power input shaft, a main power output shaft, a variator and a differential gear assembly of the type comprising, an input differential gear unit having an input shaft and a pair of interconnected differential output gear units each having an output shaft in which the speed of the output gear units are linked and are each variable from stationary to a maximum speed relative to the input gear speed with the other gear stationary, the speed of one output gear unit controlling the speed of the other output gear unit for a specific input gear speed. The differential gear assembly is used as a torque splitter delivering an output from one of the differential gear units directly to the main power output shaft and from its other differential gear unit output shaft to the variator. The output of the variator is fed either directly to the main power input shaft or to the main power output shaft. The use of such a power split transmission is well known for reducing the total power handled by the variator. One of the problems is that heretofore, suitable variators have not been available. While it is possible to use hydraulic type variators most of the mechanical type variators such as those using pulleys have such low ratio spread that they are not suitable for use with such power split transmissions.

If the variator feeds directly to the main power output shaft, then a problem arises. At low starting speed the differential gear assembly will undoubtedly split the torque between the variator and the output shaft. Unfortunately, because the main power output shaft is at a low speed then the differential output gear connected to the main power output shaft is at a relatively low speed relative to the other output shaft of the differential output gear unit. Accordingly, the input speed to the variator from this other differential output gear unit is high. Thus, the input speed to the variator is relatively high while the variator has to feed the main power output shaft so that output speed is low. This means that there is a relatively wide spread between input and output of the variator at start-up and at low speeds. Unfortunately, practical variators such as the pulley and traction types cannot handle the ratio spread required and complex arrangements such as hydraulic systems having a wide ratio spread are required.

If the alternative arrangement is considered namely, the variator feeding the input shaft it can be quite easily demonstrated that there is a certain amount of recirculation of power between the variator, main power input shaft and differential gear assembly so that part of the advantage of the power split is lost with resultant increased friction losses. A further problem is that in normal running, because all three differential gear units of the differential gear assembly are rotating in the same direction when the planet carrier is the input element and thus, on overrun i.e. when there is a tendency for the main power output shaft to run at a speed higher than that matched by the main power input shaft there is a reversal of the torque to the variator because the annulus becomes the input element into the system, which produces an enormous mechanical strain on the variator. Accordingly, these units require the use of free wheels or elaborate gearing arrangements.

In this specification the term "connected" means a direct physical connection, stepped up or down as necessary by gearing, while "fed" is the term used where the connection may not be direct but through another component of the transmission. For example, the main power input shaft feeds the main power output shaft but is not connected to it.

BRIEF SUMMARY OF THE INVENTION

The present invention is directed towards providing an improved variable speed transmission assembly.

According to the invention there is provided a variable speed transmission assembly comprising:
  a main power input shaft;
  a main power output shaft;
  a variator having an input shaft and an output shaft; and
  a differential gear assembly of the type comprising an input differential gear unit having an input shaft and a pair of differential output gear units interconnected through the input differential gear unit and each having an output shaft, in which the speed of the output gear units are linked and are each variable from stationary to a maximum speed relative to the input gear speed with the other gear stationary, the speed of one output gear unit controlling the speed of the other output gear unit for a specific input gear speed:
  characterized in that there are:
  two differential gear assemblies namely, a power split differential gear assembly and a ratio spread differential gear assembly;
  in which the main power input shaft is connected to the input shaft of the power split differential gear assembly;
  a primary, output shaft of the power split differential gear assembly is connected to the main power output shaft;
  the other, secondary, output shaft of the power split differential gear assembly is connected to the input shaft of the variator;
  the output shaft of the variator is in turn connected to the input shaft of the ratio spread differential gear assembly;
  a primary output shaft of the ratio spread differential gear assembly is connected to the main power output shaft; and
  the other, secondary, output shaft of the ratio spread differential gear assembly is fed to the input shaft of the variator.

BRIEF DESCRIPTION OF THE DRAWINGS

The invention will be more clearly understood from the following description of some embodiments thereof given by way of example only, with reference to the accompanying drawings wherein.

DETAILED DESCRIPTION

Figure 1:
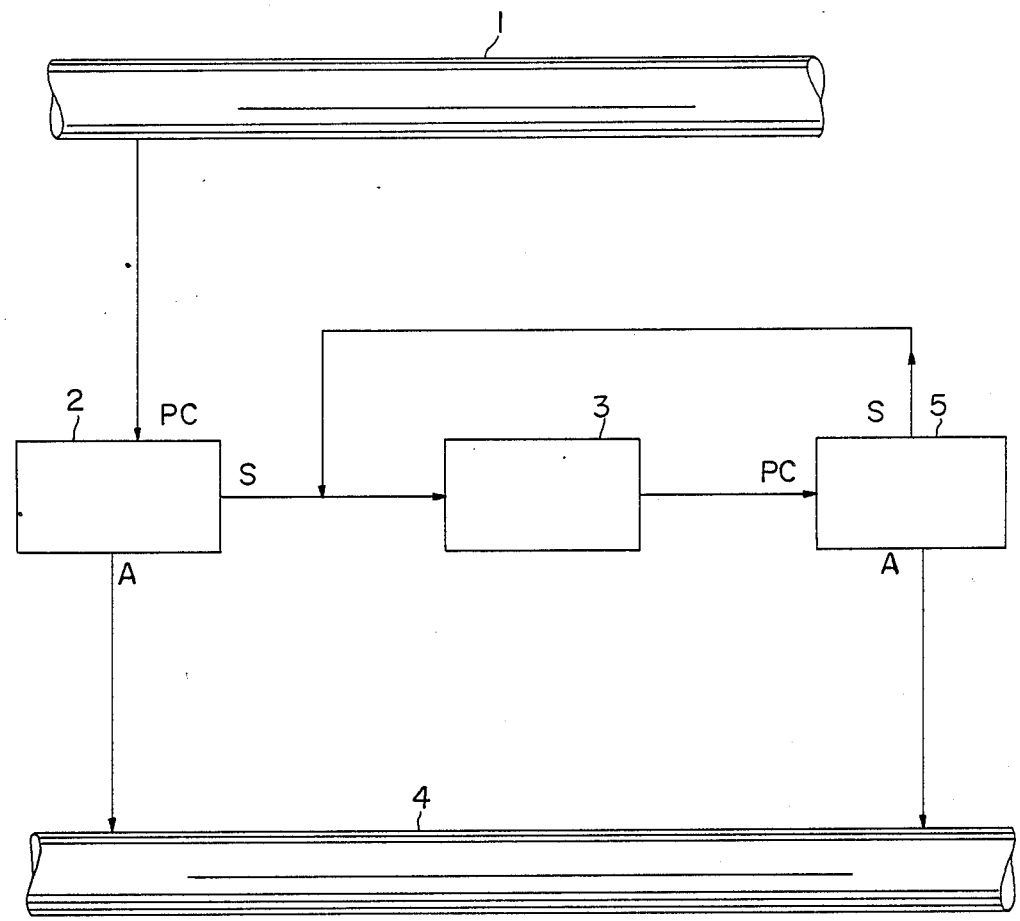
FIG. 1 is a schematic block diagram of a variable speed transmission assembly according to the invention.
Figure 2:
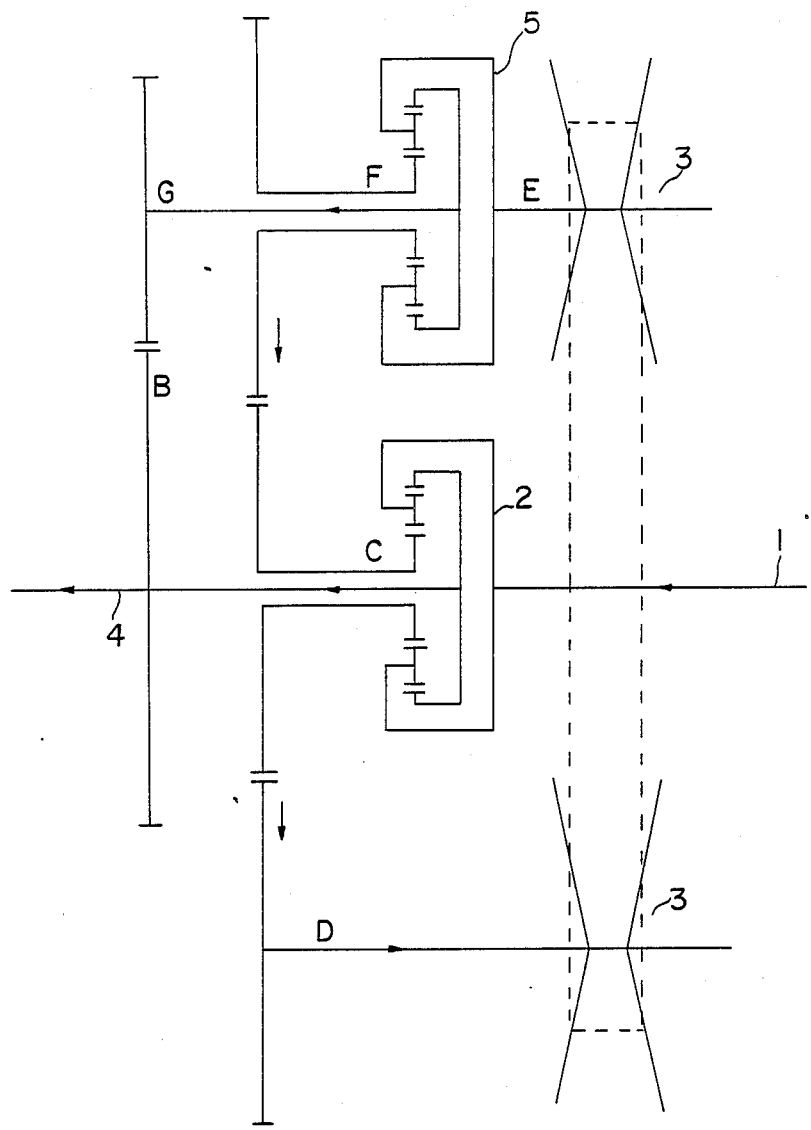
FIG. 2 is a schematic view showing the gear arrangement of the invention.

Referring to the drawings, and initially to FIGS. 1 and 2 there is illustrated a variable speed transmission assembly which comprises a main power input shaft 1 feeding a power split differential gear assembly 2 which in turn feeds a percentage of the torque inputted to it to a variator 3 and the majority of the torque to a main power output shaft 4. The variator in turn feeds a ratio spread differential gear assembly 5. The ratio spread differential gear assembly 5 then feeds both the main power output shaft 4 and the input of the variator 3. In this embodiment, the differential gear assemblies 2 and 5 are epicyclic gears having a planet carrier, an annulus gear and a sun gear identified in the drawings by the letters "PC"; "A"; and "S" respectively.

It will be appreciated, however, that the differential gear assemblies 2 and 5 may be of any conventional type comprising an input differential gear unit having an input shaft and a pair of differential output gear units interconnected through the input differential gear and each having an output shaft in which the speed of the output gear units are linked and are each variable from stationary to a maximum speed relative to the input gear unit speed with the other gear stationary. The speed of one output gear unit controls the speed of the other output gear unit for a specific input gear speed.

It will be appreciated that the manner in which power is fed between the main power input and output shafts will vary depending on road and engine speeds. The following description and illustration in the drawings of the power paths assist in understanding the invention but do not apply for all operating conditions.

Briefly, before discussing the gear ratios and output speeds in more detail, it will be appreciated that at start-up the input speed of the main power input shaft 1 is relatively high compared to the output speed of the main power output shaft 4. Thus, the speed of the annulus is relatively low compared to the speed of the sun gear from the power split epicyclic 2. Accordingly, the speed input to the variator 3 is relatively high. The output of the ratio spread epicyclic 5 namely, the annulus linked to the output shaft 4 is low because the speed of the main power output shaft 4 is low. The output speed of the sun gear of the ratio spread epicyclic 5 must be relatively high as it feeds directly into the variator. The speed of the planet carrier input from the variator 3 will be relatively low and the variator at low system output speed runs at its fastest relative to input speed. It must be remembered that it is the variator 3 that is controlling the operation. The vehicle's control system sets the ratio between input and output of the variator to match the desired spread across the variator.

To illustrate how the variator controls the operation, take the situation when the output speed of the variator is increased relative to its input speed. When this happens, the speed of the sun gear of the power split epicyclic 2 is restricted and therefore, the speed of the annulus of the power split epicyclic is increased. Meanwhile, the speed of the sun gear of the ratio spread epicyclic 5 is similarly restricted and therefore, the speed of its annulus is forced to increase. Because the speed of both annuli increase, the speed of the main power output shaft 4 increases.

Referring to FIG. 2, the variator 3 is of the pulley type and the various shafts are identified by letters. To avoid confusion, and the introduction of too many identification numerals the various shafts and the gears on them, which are used for interconnection with other shafts are identified by the same reference letters. The main power input shaft 1 feeds the planet carrier of the power split epicyclic 2, the annulus of which is connected to the main power output shaft 4. The sun of the power split epicyclic 2 is connected to a shaft C which, in turn, is connected to the input shaft D of the variator 3 by the gears C and D. The variator's output is fed on a shaft E to the planet carrier of the ratio spread epicyclic 5. The annulus of the ratio spread epicyclic 5 is connected through a shaft G to the main power output shaft 4. The sun of the ratio spread epicyclic 5 and of the power split epicyclic 2 on shafts F and C respectively are interconnected and in turn connected to the input shaft D of the variator 3 by suitable gears.

To understand the invention, the following table illustrates the operation of the invention for a certain arrangement of gearing in which the gears have the following teeth:
Gear C has 17 teeth;
Gear D has 27 teeth;
Gear F has 31 teeth;
Gear G has 15 teeth;
Gear B has 25 teeth;
Annulus gears of epicyclics 2 and 5 have 57 teeth;
Planet gears of epicyclics 2 and 5 have 15 teeth; and
Sun gears of epicyclics 2 and 5 have 27 teeth.

The speeds and ratios of the various shafts of the variable speed transmission assembly for a constant main power input shaft speed of 515 rpm are given for three levels of speed of the main power output shaft B, as follows:

| SHAFTS - SHAFT 1 INPUT 515 rpm | | | | | | | |
|---|---|---|---|---|---|---|---|
| Speed 1 (rpm) | Ratio 1:4 | Speed C (rpm) | Speed D (rpm) | Speed E (rpm) | Ratio D:E | Speed F (rpm) | Speed G (rpm) |
| 102 | 5.05:1 | 1386 | 873 | 360 | 2.43:1 | 760 | 170* |
| 515 | 1:1 | 515 | 324 | 674 | 1:2.08 | 282 | 858** |
| 550 | 0.94:1 | 439 | 276 | 701 | 1:2.54 | 240 | 918*** |

Note:-
*denotes starting conditions;
**denotes cruising conditions (when all three of the gears of the power split epicyclic 2 are at the same speed); and
***denotes overdrive conditions It will be appreciated that these three conditions have been chosen because they represent the two extreme conditions and the ideal condition (i.e. cruising).

It will be noted that to incorporate the variable speed transmission assembly into a car, a final drive ration of 2.57:1, between the shaft 4 and the final drive is required. Thus, the total ratios for the extreme conditions above are 12.98:1 and 2.40:1 respectively.

The important points to note are that the variator ratio has a very small spread of 6.17 between the values of 2.43:1 and 1:2.54 for the extreme conditions of start-up and overdrive, respectively. Another important point to note is that the variator shafts D and E have maximum speeds of only 873 rpm and 701 rpm respectively. Therefore, because of this low ratio spread and low maximum speeds, a conventional variator such as the V-shaped pulley or the traction types may be used. It must be emphasized that the reason for this is that the variator 3 only needs to match the speed between the sun shaft C of the power split epicyclic 2 and the planet carrier shaft E of the ratio spread epicyclic 5. The ratio spread epicyclic 5 automatically performs the function of bridging the gap between the output of the variator and the main power output shaft. For comparison, it will be noted that a variator in a typical non-power split transmission assembly would reach a speed of over 1100 rpm in overdrive for an input speed of 515 rpm. It will be noted that A is effectively the planet carrier, B is effectively the annulus and C is effectively the sun of the power split epicyclic 2.

It will be appreciated that the advantages of the invention are obtained because the variator is arranged to be the controlling element, and therefore, by controlling the variator ratio, the variator (with a relatively small power-handling capacity) can handle a much larger power throughput. It will further be appreciated that the variator of the present invention is required to operate at much lower speeds than heretofore.

Figure 3:
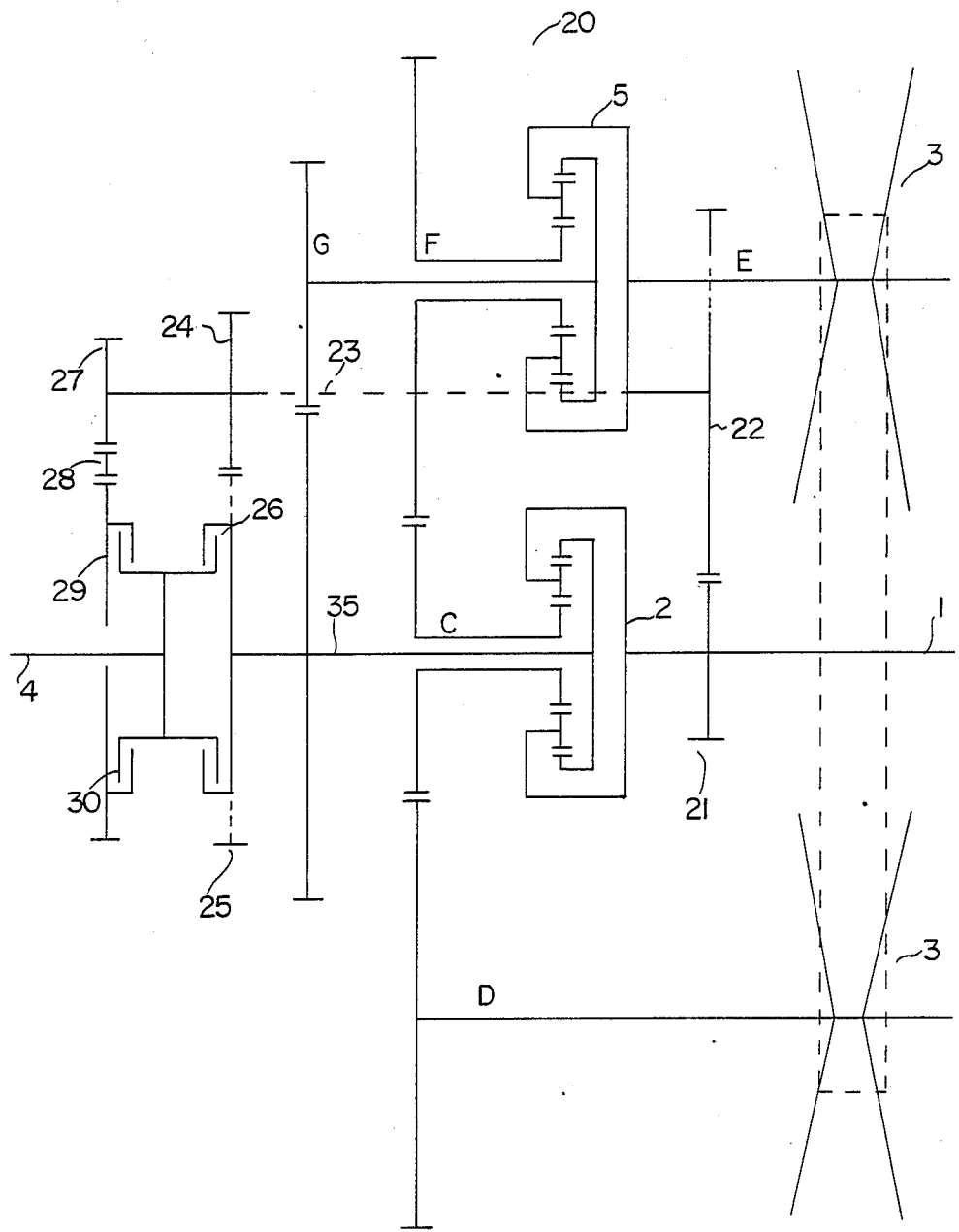
FIG. 3 is schematic view of the gear arrangement of FIG. 2 fixed forward and reverse gears added.

Needless to say, many different gearing arrangements may be used, for example, the variator 3 may be secured directly to the shaft C at one end. Referring to FIG. 3 there is illustrated a modified variable speed transmission assembly largely similar to that described in FIGS. 1 and 2 and indicated by the reference numeral 20. Parts similar to those described with reference to the previous drawings are identified by the same reference numerals and letters. The variable speed transmission assembly 20 includes a fixed first gear formed from a gear 21 on the main power input shaft 1 driving a gear 22 on a shaft 23. The gear 22 is not connected to the shaft E even if it appears so in the drawing. The shaft 23 is in turn connected by a gear 24 to a sprag free wheel gear 25 on a shaft 35. A clutch 26 is provided for connecting the shaft 35 to the main power output shaft 4. The shaft 23 also has a gear 27 connected to an idler gear 28 which is, in turn, connected to a reverse gear 29. The reverse gear 29 is connected to the output shaft 4 through a clutch 30.

In use, the clutch 26 is engaged and at start-up the main power input shaft 1 drives the gear 22 and thence the sprag free wheel gear 25. The sprag free wheel drives the output shaft 4. The variator 3 also drives the shaft 35 at the same speed, but does not affect its rotation because the variator is handling very little power. When the vehicle's control system changes the ratio of the variator to increase the speed of the shaft 35 above that of the sprag free wheel gear 25, then the sprag free wheel gear 25 acts as a free wheel bearing. When this happens, the shafts 4 and 35 rotate at the higher speeds dictated by the variator.

It will be appreciated that this arrangement acts to prevent excessive torque being transmitted through the variator at start-up, or on steep inclines etc. As a result, a variator with a much smaller power capacity than at present may be used.

To reverse the vehicle, the clutch 30 is engaged and drive is transmitted through the input shaft 1, the shaft 23 and thence through the idler gear 28 to the reverse gear 29. It will be appreciated that this reverse gear train is, in principle, similar to those of manual gear boxes because the variator is by-passed. Therefore, problems, due to malfunctioning of the variator are avoided.

Figure 4:
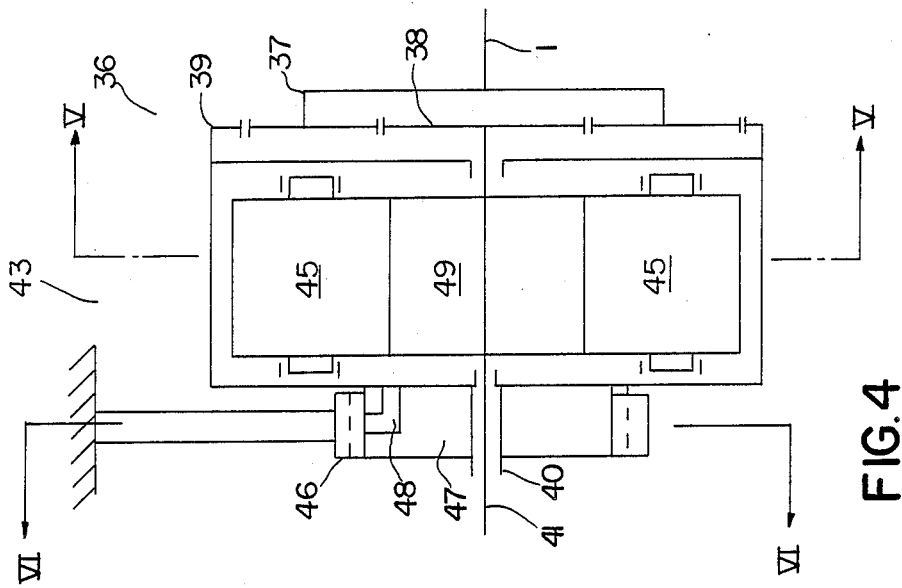
FIG. 4 is a diagrammatic side view of a portion of an alternative construction of a variable speed transmission assembly according to the invention.
Figure 5:
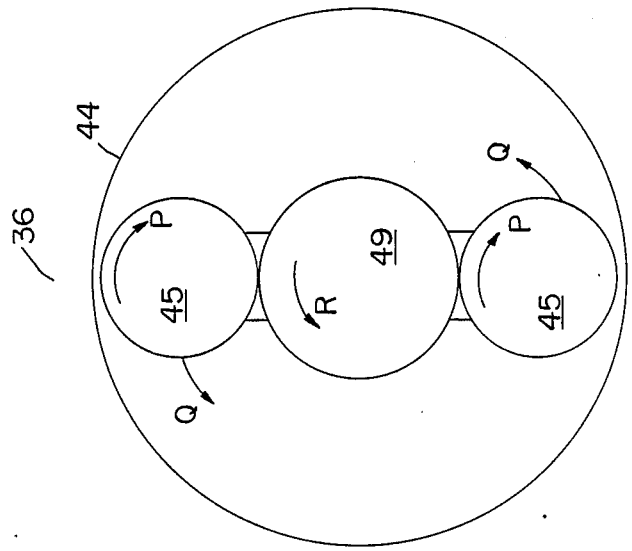
FIGS. 5 and 6 are diagrammatic cross-sectional views taken along lines V-V and VI-VI, respectively, of a FIG. 4.
Figure 6:
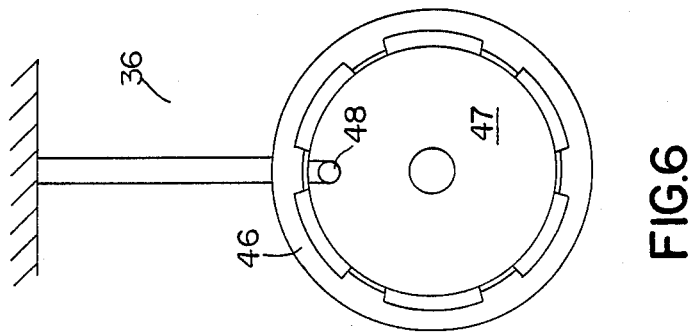

Referring now to FIGS. 4 to 6, there is illustrated an alternative construction of differential gear assembly indicated generally by the reference numeral 36. This differential gear assembly has power take off means for periodically connecting its secondary shaft to the main power output shaft. The differential gear assembly 36 may be used as either ratio spread or power split assemblies. The differential gear assembly 36 may be used with the transmission assemblies of FIGS. 2 or 3 or any other variable speed transmission assembly of the invention. The differential assembly 36 comprises, in conventional manner, an epicyclic having a planet carrier 37 driving a sun gear 38 and an annulus gear 39. The annulus gear 39 is connected to a primary output shaft 40 for driving the main power output shaft 4 and the sun gear 38 is connected to a secondary output shaft 41 for connection with the variator 3 input. Power take off means for periodically connecting directly the sun gear 38 and the annulus gear 39 and thereby causing the secondary output shaft 41 to transfer torque to the primary output shaft 40 are in this embodiment provided by a hydraulic pump 43 having a housing 44 fixed to the annulus 39, a drive gear rotor 49 on the secondary output shaft 41 and a pair of idler gear rotors 45 rotatably mounted in the pump housing 44. Means for supplying hydraulic fluid to the pump 43 are provided by a fixed valve ring 46 inside which rotates a port rotor 47. The valve ring 46 has six restricting blocks and six free outlet parts. The port rotor 47 is secured to the pump housing 44. A fluid outlet 48 is provided for discharging fluid from the pump 43.

In use, the epicyclic sun gear 38 drives the drive gear rotor 49 and the secondary output shaft 41. The annulus gear 39 and the pump housing 44 both rotate carrying with them the freely rotating idler gear rotors 45 which are engaged with the drive gear rotor 49 as indicated by the arrow Q. The direction of rotation of the drive gear rotor 49 is indicated by the arrow R. The port rotor 47 rotates with the pump housing 44 and meanwhile hydraulic fluid, in this case oil, is pumped into the pump housing 44 by an inlet not shown, and thence between the gears as determined by their direction of rotation and out of the pump 43 through the fluid outlet 48. The various directions of rotation are indicated by the letters P, Q and R. However, as the port rotor 47 rotates, the hydraulic outlet 48 is blocked six times for every rotation. When this happens, high pressure instantly builds up inside the pump housing 44 and a reaction pulse torque is generated with causes the pump housing 44 and the pump planet gears 45 to react in a forward torque pulsing movement. This is because the idler gear rotors 45 are not allowed to rotate freely as the oil is blocked and hence they ar connected directly to be driven by the drive gear rotor 49. In this way, each time the oil is blocked, torque is periodically transferred from the secondary output shaft to the primary output shaft in the pump housing 44. This pulsing torque transfer is complemented in the epicyclic. The end result is that torque is transferred from the secondary output shaft and added to the torque which is already being transmitted by the primary output shaft 40. When the primary output shaft is turning much more slowly than the secondary output shaft, the periodic connections give the primary a torque impact which has the effect of multiplying the torque from the secondary.

It will be noted that this power take off action does not occur when the primary output shaft is operating at the same or higher speed than the secondary output shaft. This is an important feature of the invention as when a variable speed transmission assembly is "up and running" with the primary output shaft running at full speed there is generally no need for extra torque to be transmitted to this shaft. However, on start up when the primary output shaft 40 requires a large amount of torque the power take off action is at its most effective condition in transferring torque.

Essentially the power take off means is an intermittently connected hydraulic coupling and any form of hydraulic coupling may be used. The embodiment described is a particularly suitable form of gear pump but more conventional constructions could be used as a hydraulic coupling.

Figure 7:
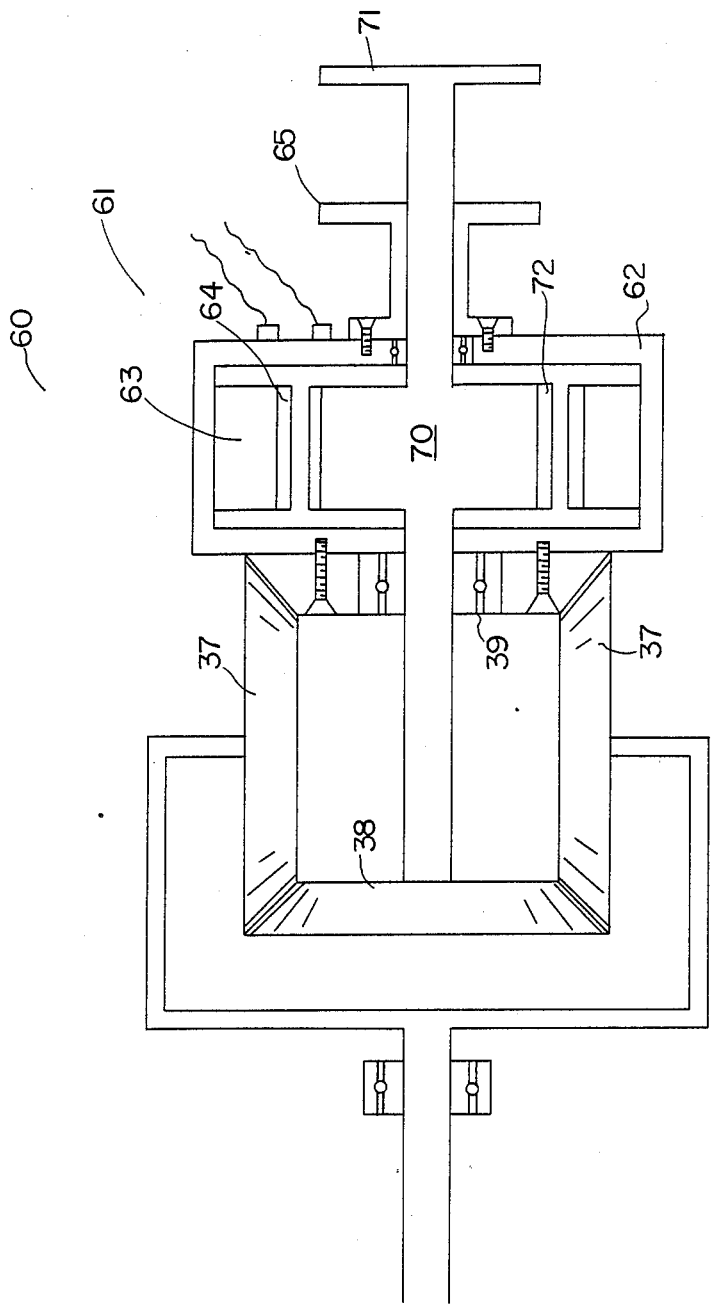
FIG. 7 a diagrammatic side view of a portion of a further alternative construction of variable speed transmission assembly.

Referring now to FIG. 7 there is illustrated a further construction of power split differential gear assembly having power take off means according to the invention indicated generally by the reference numeral 60. Like parts are assigned the same reference numerals. The power split differential gear assembly in this embodiment includes four cross-axis bevel gears which are effectively similar to the epicyclic of FIG. 4. For simplicity, corresponding gears are assigned the same reference numerals. Power take off means are in this case formed from an electro-magnetic assembly 61 comprising a casing 62 secured to the "annulus" bevel gear 39 and to a primary rotor 63 having field windings 64. The casing 62 is rigidly secured to a primary output shaft 65. The power take off means also comprises a rotor 70 fixed to the "sun" bevel gear 38 and to a secondary output shaft 71. The secondary rotor 70 has electrical conductors 72.

The field windings 64 of the primary rotor 63 are connected to a generator, not shown, adapted to supply pulsed drive currents through slip rings and brushes, not shown.

In use, the secondary rotor 70 is driven, and by magnetizing the field windings 64 of the primary rotor 63, torque is transferred to the primary rotor. However, as pulsed drive currents are supplied to the field windings 64 a reaction pulse torque is generated in the primary rotor 63. The pulses supplied by the generator to the field windings 64 are of opposite polarity to those induced in the field Windings by the secondary rotor 70. In this way, the momentum of the secondary rotor 70 can be extracted periodically, provided the primary rotor 43 is at a lower speed. This has the effect of connecting directly the output bevel gears. The higher the speed difference between the primary and secondary rotors, the greater is the torque transferred from the secondary power path to the primary power path. The generator for feeding the drive current pulses to the field windings 64 can be of any known type and may be driven either by the secondary or primary output shafts or by any other prime mover.

The differential assembly 60 may be AC or DC operated. In DC operation, the secondary rotor may be a permanent magnet without conductors, whereas in AC operation the secondary rotor may be of the squirrel cage type with short circuited conductors. Control of the assembly 60 may be achieved by any type of control circuit.

In effect this assembly forms an electrical brake for intermittent rigid connection and again there are many ways of achieving this.

It has been found that with the power take off arrangement, approximately 80% of torque from the main power input shaft 1 is transmitted in the form of a high multiplied torque directly to the main power output shaft at start-up. As a result, a variator with a much lower torque-handling capacity may be used and re-circulation of torque within the variable speed transmission assembly is greatly reduced.

It will be appreciated that the invention permits the use of a variator such as the traction type, even though it can only handle the same ratio spread and speeds of the conventional V-shaped pulley type. It will further be appreciated that the traction-type variator is quite easily connected into the variable speed transmission unit of the invention.

The invention is not limited to the embodiments hereinbefore described, but may be varied in construction and detail.

We claim:

1. In a variable speed transmission assembly wherein a variator has an input shaft fed by a main power input shaft and an output shaft feeding a main power output shaft, power from the main power input shaft is split between the main power output shaft and the variator by a power split differential gear assembly having an input shaft and primary and secondary output shafts, the input shaft of the power split differential gear assembly being connected to the main power input shaft, the primary output shaft being connected to the main power output shaft, and the secondary output shaft being connected to the variator input shaft, and a second differential gear assembly is provided having an input shaft connected to the variator output shaft, a primary output shaft connected to the main power shaft and a secondary output shaft connected for power feedback, the improvement comprising:

an arrangement whereby said second differential gear assembly is a ratio spread differential gear assembly for reducing the ratio spread required of the variator by connection of said secondary output shaft of the ratio spread differential gear assembly to the input shaft of the variator for delivery of all power of said secondary output shaft of said ratio spread differential gear assembly to the variator.

2. A variable speed transmission assembly as claimed in claim 1 wherein: said main power input shaft is connected to a sprag free wheel gear, and said sprag free wheel gear is connected to said main power output shaft.

3. A variable speed transmission assembly as claimed in claim 4 wherein: power take off means are provided for periodically connecting said secondary output shaft of a differential gear assembly to said main power output shaft.

4. A variable speed transmission assembly as recited in claim 3 in which the power take off means is an intermittently operated hydraulic coupling.

5. A variable speed transmission assembly comprising:
a main power input shaft;
a main power output shaft;
a variator having an input shaft and an output shaft;
a power split differential gear assembly comprising a differential input gear unit having an input shaft connected to said main power input shaft, and a pair of differential output gear units, one gear unit of said pair having a primary output shaft connected to said main power output shaft and the other gear unit of said pair having a secondary output shaft connected to said input shaft of said variator;
a ratio speed differential gear assembly comprising a differential input gear unit having an input shaft connected to said variator output shaft, a pair of differential output gear units, one gear unit of said pair of output gear units of said ratio spread gear assembly having a primary output shaft connected to said main power output shaft and the other gear unit of said pair of output gear units of said ratio spread gear assembly having a secondary output shaft feeding said input shaft of said variator; and
power take off means comprising an intermittently operated hydraulic coupling for periodically connecting said secondary output shaft of a differential gear assembly to said main power output shaft, said hydraulic coupling comprising a recirculating gear pump having a housing and a pair of gear rotors, said housing being rigidly connected to one of said output shafts, one of said pair of gear rotors forming an idler gear rotor within said housing, the other of said pair of gear rotors being a drive gear rotor rigidly connected to the other of said output shafts, and the input and the output of said pump being interconnected through a valve intermittently operated on rotation of one of said output shafts.

6. A variable speed transmission assembly as claimed in claim 5 wherein: three gear rotors are provided and said drive gear rotor engages a pair of diametrically in-line idler gear rotors.

7. A variable speed transmission assembly comprising:
a main power input shaft;
a main power output shaft;
a variator having an input shaft and an output shaft;
a power split differential gear assembly comprising a differential input gear unit having an input shaft connected to said main power input shaft and a pair of differential output gear units, one of said gear units of said pair having a primary output shaft connected to said main power output shaft and the other of said gear units of said pair having a secondary output shaft connected to said input shaft of said variator;
a ratio spread differential gear assembly comprising a differential input gear unit having an input shaft connected to said variator output shaft, a pair of differential output gear units, one gear unit of said pair of output gear units of said ratio spread gear assembly having a primary output shaft connected to said main power output shaft and the other gear unit of said pair of output gear units of said ratio spread gear assembly having a secondary output shaft feeding said input shaft of said variator; and
power take off means comprising an electrical brake for intermittent rigid connection of said secondary output shaft of a differential gear assembly to said main power output shaft.

8. A variable speed transmission assembly as claimed in claim 7 wherein: said electrical brake comprises an electrically conducting rotor connected to said secondary output shaft and magnetically coupled with a rotor having field windings connected to said primary output shaft, said field windings being fed current of opposite polarity to that induced by said secondary rotor, thereby periodically causing said primary rotor to be effectively connected directly to said secondary rotor.

* * * * *